Nov. 7, 1939.    C. L. OTT    2,178,642
LUBRICATING MECHANISM
Filed July 17, 1936
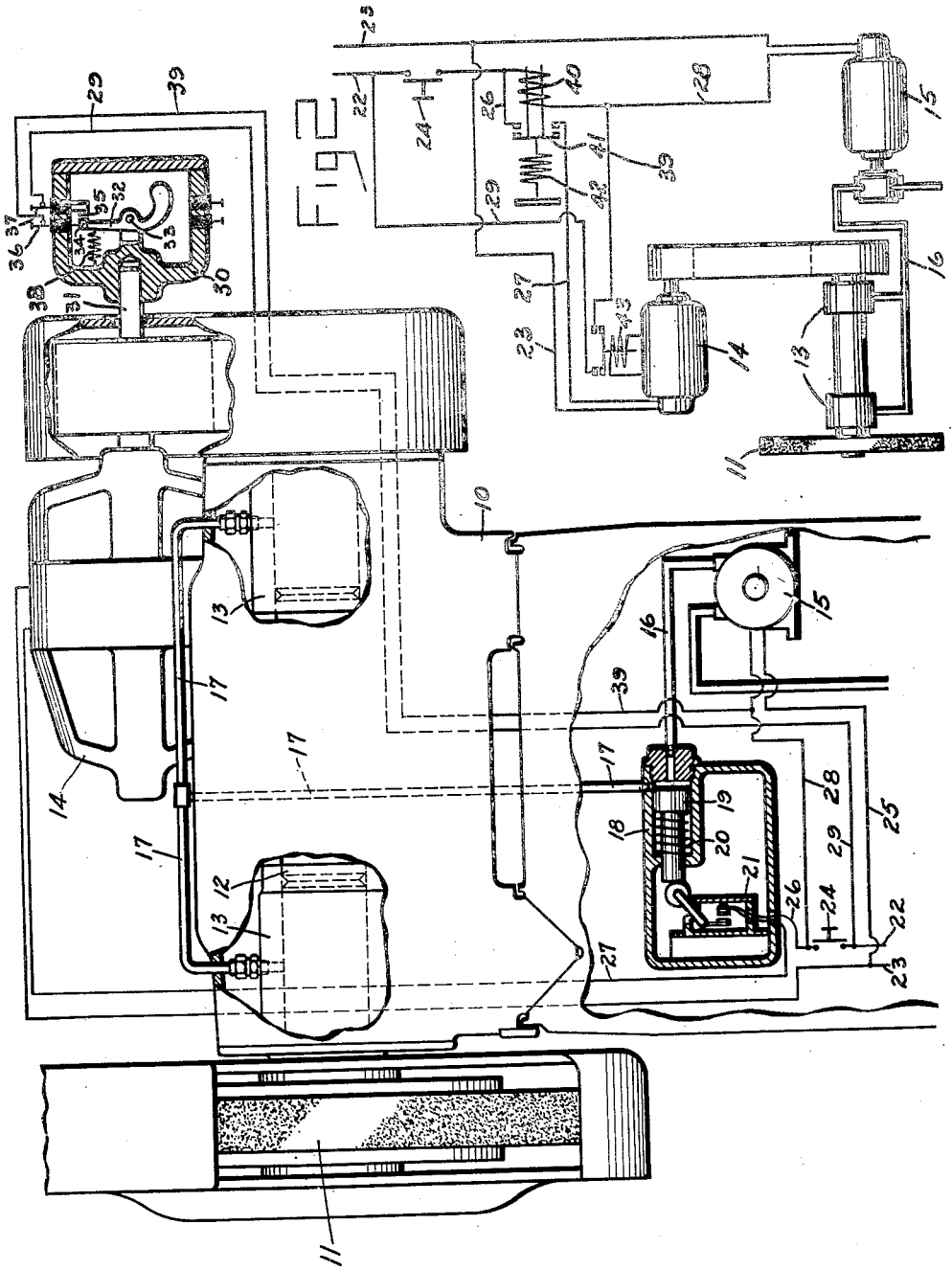
INVENTOR
CONRAD L. OTT
BY
Hugh N. Rocke
ATTORNEY Patented Nov. 7, 1939

2,178,642

UNITED STATES PATENT OFFICE 2,178,642

LUBRICATING MECHANISM

Conrad L. Ott, Waynesboro, Pa., assignor to Landis Tool Company, Waynesboro, Pa., a corporation Application July 17, 1936, Serial No. 91,219

7 Claims. (Cl. 184—6)

My invention relates to lubricating mechanism and it is an object thereof to provide a supply of lubricant to a bearing before any movement takes place.

A further object is to provide mechanism for automatically starting a driving motor after a supply of lubricant has been provided at the bearing surface of the driven part.

A further object is to provide automatic means responsive to pressure changes in the supply of lubricant for starting a driving motor.

A further object is to provide means responsive to an increase in the load on the motor for driving the lubricant pump for starting the said driving motor.

A further object is to keep the lubricant pump operating until relative movement between the surfaces to be lubricated has ceased.

My device is shown applied to a motor driven grinding wheel bearing of a grinding machine and consists of a motor driven pump for supplying oil to said spindle bearings. In the supply line from the pump to the bearings is located a pressure operated switch which is effective to start up the spindle driving motor only when the pressure in the lubricant supply has reached the point sufficient to insure adequate supply of lubricant for starting. A single starting switch is used for both motors. When the starting switch has been opened and current to the spindle driving motor cut off it is desired to keep the pump motor operating until the wheel spindle has come to a stop. This is accomplished by attaching a centrifugal switch of any suitable construction to the end of either the spindle or the driving motor. This switch will remain closed so long as said spindle or motor continues to rotate and will thus be effective to keep the pump in operation until the spindle comes to a rest.

Another form of my invention consists of a load relay switch for starting the wheel spindle motor. The coil of this switch is inserted in the line leading to the pump motor and the switch remains open until the load on the pump motor, due to increase in pressure in the lubricant supply line has increased to such a point that it will close the switch for said wheel driving motor. The means for keeping the pump driving motor going after the current has been cut off to the wheel driving motor comprises a relay energized by current generated in the motor after the switch has been opened.

Figure 1 is a front elevation of a wheel support broken away in part to show the application of my device.

Figure 2 is a diagrammatic sketch of another form of my invention.

In the drawing reference character 10 indicates a wheel support for a grinding machine carrying a grinding wheel 11 mounted on a spindle 12 and bearings 13. Said spindle is driven by a motor 14 thru a belt and pulley arrangement not disclosed. Lubricant is supplied to said spindle by a motor driven pump 15 thru fluid lines 16 and 17. Inserted in the fluid line between lines 16 and 17 is an hydraulically operated switch consisting of a cylinder 18 in which is mounted a piston 19 adapted to be moved in one direction by the pressure in the lines 16 and 17 and in the other direction by spring 20. When actuated by fluid under pressure said piston operates a limit switch 21. In the electrical circuit leading to the wheel drive motor 14, the current is supplied to motor 14 and to the motor for pump 15 from lines 22 and 23. Starting switch 24 in line 22 completes the circuit to motor driven pump 15 and partially completes the circuit to wheel driving motor 14. Line 23 is an unbroken connection to motor 14 and a branch 25 from said line forms another unbroken connection to motor driven pump 15. From switch 24 there is a connection 26 to switch 21 and another connection 27 from switch 21 to motor 14. From switch 24 there is also a direct connection 28 to motor driven pump 15. From line 22 another line 29 leads to a centrifugal switch housing 30 on the end of motor shaft 31. Said switch consists of an arm 32 pivoted at 33, one end of said arm being bent to form substantially a right angle. This end is much heavier than the other end and is effective upon rotation of the housing 30, and due to the centrifugal force exerted upon such rotation, to cause said arm to rotate in a clockwise direction about the pivot 33. The other end of said arm 32 forms an electrical contact 34 which engages another contact 35. These contacts form the terminals of a pair of slip rings 36 and 37 on the outside of housing 30. Contact 34 is urged away from contact 35 by spring 38, one end of which is attached to housing 30 and the other end to the arm 32. Said line 29 contacts slip ring 37 and another line 39 which contacts slip ring 36 leads back to the driving motor of pump 15. Thus, current may be supplied to said pump driving motor after switch 24 has been opened. Upon closing switch 24 current may be supplied to pump driving motor 15 thru line 28. Current may also be supplied to said motor independent of said switch thru line 29, centrifugal switch and line 39.

Method of operation

In order to start wheel driving motor 14, the operator closes switch 24 which supplies current to pump drive motor 15, thru lines 25 and 28. Said pump begins to supply fluid under pressure thru line 16, cylinder 18 and line 17 to bearings 13. As soon as a predetermined pressure has been built up in cylinder 18 to overcome spring 20, piston 19 will be actuated to close switch 21, thus completing the circuit to motor 14. When it is desired to stop motor 14 the operator opens switch 24, thus cutting off the supply of current to said motor. The grinding wheel and spindle continue to rotate for some time after the current has been cut off and it may be desirable to insure a positive supply of lubricant until said spindle has stopped rotating. In order to accomplish this an auxiliary line 29 leads from line 22 thru centrifugal switch 30 and back thru line 39 to a motor driven pump 15. So long as the grinding wheel and driving motor continue to rotate due to the momentum of the parts thereof the centrifugal switch 30 will remain closed. As soon as parts stop rotating said switch will be opened by spring 38 and the auxiliary supply of current to the motor driven pump 15 will be cut off.

The second form of my invention disclosed in Figure 2 differs from that disclosed in Figure 1, in the method of operating the switch controlling the wheel drive motor and the method of continuing operation of the pump motor. In this case a load relay switch 41 is substituted for the switch 21 of Figure 1. This relay is normally held in open position by spring 42. The coil for operating this switch is inserted in one of the lines leading to the pump motor 15. A relay 43 is connected to the winding of the motor 14 and is utilized to close the bypass lines 29 and 39 to motor 15. Relay 43 is actuated by the current generated by motor 14 after switch 24 has been opened to cut off the supply of current to said motor.

Method of operation

A pump drive motor 15 is started by closing switch 24. As soon as the load on the pump 15 reaches a predetermined point due to the passage of the lubricating medium thru bearings 13, the coil 40 is sufficiently energized to overcome spring 42 and close switch 41 thus completing the circuit to wheel drive motor 14. When switch 24 is opened to cut the supply of current to motor 14, the momentum of the grinding wheel and other rotating parts causes said rotation to continue, and under such conditions motor 14 generates sufficient current to maintain relay 43 closed and thereby establish a bypass around switch 24 to maintain a supply of current to motor 15. When the motor 14 slows down to a point where it no longer generates sufficient current to hold relay 43 closed, said relay will open and stop the pump drive motor 15.

A single source of current has been shown for both motors since this is the simplest method where both motors use the same type of current. Obviously a similar control arrangement could be utilized even though one motor was A. C. and the other D. C.

I claim:

1. A device of the kind described comprising a movable machine element, bearing surfaces for said element, mechanism for driving said element, a source of power for said driving mechanism, means for supplying lubricant to said bearing surfaces at a uniform rate and means for continuing the supply of said lubricant at said uniform rate after said source of power has been disconnected and until said element has slowed down to a predetermined point.

2. The combination of a driven member, a motor for driving the same, a lubricating pump for supplying lubricant to the bearings for said driven member, a motor for operating said pump, means for supplying current to both motors, and a control means for starting and stopping the motors including devices whereby the current supply to the motor operating the pump is controlled by the speed of the driven member.

3. The combination of a driven member, a motor for driving the same, a lubricating pump for supplying lubricant to the bearings for said driven member, a motor for operating said pump, lines for supplying current to both motors, a starting switch in said supply lines for controlling the starting and stopping of said motors, and means for supplying current from said lines to the motor operating the pump including a switch controlled by the speed of the driven member whereby said pump motor will continue to operate until said driven member stops.

4. The combination of a driven member, a motor for driving the same, a lubricating pump for supplying lubricant to the bearings for said driven member, a motor for operating said pump, means for supplying current to both motors, a switch for controlling the supply of current to both motors, and a switch automatically operated by the speed of the driven member for controlling the supply of current to the motor operating the pump whereby when the switch for stopping the motors is operated, the motor operating the pump will continue to supply lubricant until the driven member stops.

5. In a device of the kind described a movable machine element and means for driving same, bearing surfaces for said element, mechanism for supplying lubricant to said bearing surfaces including a motor driven pump, a load relay connected to said pump motor and operable in response to a decrease in the load on said motor for stopping said driving means.

6. In a device of the kind described, a movable machine element and means for driving same including an electric motor, a source of power for said motor, a relay attached to said motor, bearing surfaces for said machine element, mechanism for supplying lubricant to said bearing surfaces including a pump and a motor for driving same, a circuit thru said relay to said pump motor, and means whereby the current generated by said motor after the source of supply thereto has been cut off is effective to operate said relay to maintain a closed circuit to said pump motor until said machine element has slowed down to a predetermined point.

7. In a device of the kind described, a movable machine element, means for driving the same, bearing surfaces for said element, mechanism for supplying lubricant to said bearing surfaces including a motor driven pump, a load relay mechanism connected to said pump motor and operable in response to an increase in the load on the motor for starting said driving means, and operating on a decrease in the load on said motor for stopping said driving means.

CONRAD L. OTT.